United States Patent
Hutchinson et al.

(10) Patent No.: US 11,153,346 B2
(45) Date of Patent: Oct. 19, 2021

(54) SECURE NETWORK DEVICE MANAGEMENT IN A TELECOMMUNICATIONS NETWORK

(71) Applicant: Level 3 Communications, LLC, Broomfield, CO (US)

(72) Inventors: Thomas D. Hutchinson, Boulder, CO (US); Scott Galvin, Castle Rock, CO (US)

(73) Assignee: Level 3 Communications, LLC, Broomfield, CO (US)

( * ) Notice: Subject to any disclaimer, the term of this patent is extended or adjusted under 35 U.S.C. 154(b) by 174 days.

(21) Appl. No.: 16/176,776

(22) Filed: Oct. 31, 2018

(65) Prior Publication Data

US 2019/0132362 A1 May 2, 2019

Related U.S. Application Data

(60) Provisional application No. 62/579,702, filed on Oct. 31, 2017.

(51) Int. Cl.
*H04L 29/06* (2006.01)
*H04L 12/24* (2006.01)

(52) U.S. Cl.
CPC .......... *H04L 63/20* (2013.01); *H04L 41/069* (2013.01); *H04L 41/0866* (2013.01); *H04L 63/102* (2013.01); *H04L 63/123* (2013.01); *H04L 63/1408* (2013.01)

(58) Field of Classification Search
CPC ..... H04L 63/20; H04L 63/102; H04L 41/069; H04L 63/1408; H04L 41/0866; H04L 63/123; H04L 63/101; H04L 29/06; H04L 12/24

See application file for complete search history.

(56) References Cited

U.S. PATENT DOCUMENTS

| | | | |
|---|---|---|---|
| 2006/0278694 A1* | 12/2006 | Jha | H04L 63/145 235/379 |
| 2010/0269175 A1* | 10/2010 | Stolfo | H04L 63/1491 726/22 |
| 2011/0154216 A1* | 6/2011 | Aritsuka | G06F 9/451 715/745 |
| 2016/0381032 A1* | 12/2016 | Hashmi | H04L 63/102 726/4 |
| 2018/0322273 A1* | 11/2018 | Biondo | B60R 25/24 |

* cited by examiner

*Primary Examiner* — Quazi Farooqui

(57) ABSTRACT

A secure network device management system and method include monitoring and validating commands to network devices before such commands are executed. The security system accumulates inputs from a network device intended for display on a terminal and provided by the network device in response to inputs from the terminal and received by the network device. When a control input to execute the command is received from the terminal, the security system reproduces the command from the accumulated inputs and compares the reproduced command to a command list to determine whether the command is authorized. If so, the security system provides the control input to the network device such that the network device executes the command. Otherwise, the security system may delete the command and transmit an alert to the terminal.

14 Claims, 9 Drawing Sheets

SECURE NETWORK DEVICE MANAGEMENT IN A TELECOMMUNICATIONS NETWORK

CROSS-REFERENCE TO RELATED APPLICATIONS

This application is related to and claims priority under 35 U.S.C. § 119(e) from U.S. Patent Application No. 62/579,702, filed Oct. 31, 2017, titled "SECURE NETWORK DEVICE MANAGEMENT IN A TELECOMMUNICATIONS NETWORK," the entire content of which is incorporated herein by reference for all purposes.

TECHNICAL FIELD

Embodiments of the present disclosure generally relate to systems and methods for implementing a telecommunications network and more specifically for a security system for validating commands to network devices before such commands are executed.

BACKGROUND

Telecommunication or other types of computer networks provide for the transmission of information. Such information may involve voice, data, multimedia information, software (including patches and updates), and various others forms of digital content, and digital services, among many other things. In addition, telecommunication networks often offer features and/or services to the customers of the network that provide flexible and varied ways in which the communications are transmitted over the network. For example, some telecommunication networks provide Internet access to its customers, long distance voice capabilities, high definition audio and/or video communication capabilities, and the like. In other examples, the telecommunication network may be utilized to provide connectivity to one or more cloud-based resources.

To configure or otherwise manage the telecommunications network, the telecommunications network may include a network operations center (NOC). Within the NOC, systems provide mechanisms for accessing the various components of the telecommunications network to configure or otherwise manage such components. For example, a network engineer or administrator may receive a request from a customer of the network to add new connection points or ports into the network from the customer's network. The network engineer may utilize a terminal within the NOC to log into and configure the affected network components in response to the received request. Other configurations of network components may also be executed through the NOC systems, such as rebooting components, adding and deleting ports, creating communication links between components, decommissioning devices, and the like.

NOC systems, like other systems, should have proper security in configuring or otherwise interacting with the components of the network, and often rely on training of administrators to understand the proper commands and to which network devices commands may be transmitted. Some NOC systems may deny access to administrators without proper approval such that responding to a request from a customer may require waiting until an authorized administrator is available.

SUMMARY

In one aspect of the present disclosure, a method for managing network devices is provided. The method includes transmitting inputs received from an input device to a network device, the inputs corresponding to a command. The method further includes storing characters received from the network device in response to the transmitted inputs in an accumulator. When a control input is received from the input device for executing the command at the network device, the command is reproduced from the characters stored in the accumulator. The method next includes verifying whether the reproduced command is authorized for execution at the network device.

In certain implementations verifying whether the reproduced command is authorized includes determining if the reproduced command is at least one of included in a list of authorized commands for the network device or excluded from a list of unauthorized commands for the network device. In such implementations, the list of authorized commands and/or the list of unauthorized commands may be based on one or more of a type of the network device or credentials or other characteristics of a user of the user computing device.

The method may include transmitting the control input to the network device to cause the network device to execute the command when the reproduced command is authorized. The method may also include at least one of deleting the command from the network device when the reproduced command is not authorized, transmitting a message for display at the user computing device indicating that the command was unauthorized, or generating a log entry corresponding to the command.

In certain implementations, the method may also include storing the inputs received from the input device of the user computing device in a keyboard accumulator.

In other implementations, the method may include waiting a predetermined delay period after receiving the control input from the input device of the user computing device and verifying whether the reproduced command is authorized for execution at the network device.

In another aspect of the present disclosure, a system for managing network devices is provided. The system includes a network security system configured to receive and transmit inputs to a network device and to store characters received from the network device in response to the transmitted inputs in an accumulator, the characters being for a command. The network security system is also configured to receive a control input for executing the command at the network device and, in response to receiving the control input, to reproduce the command for from the characters stored in the accumulator. The network security system may then verify whether the reproduced command is authorized for execution at the network device.

In yet another aspect of the present disclosure, one or more non-transitory tangible computer-readable storage media storing computer-executable instructions for performing a computer process on a computing system is provided. The computer process includes transmitting inputs received from an input device to a network device, the inputs corresponding to a command and storing characters in an accumulator, the characters received from the network device in response to the transmitted inputs. The computer process also includes receiving a control input from the input device, the control input for executing a pending command at the network device, and, in response to receiving the control input, generating a reproduced command for the network device from the plurality of characters stored in the accumulator. The computer process further includes verifying whether the reproduced command is authorized for execution at the network device.

DETAILED DESCRIPTION

Figure 1:
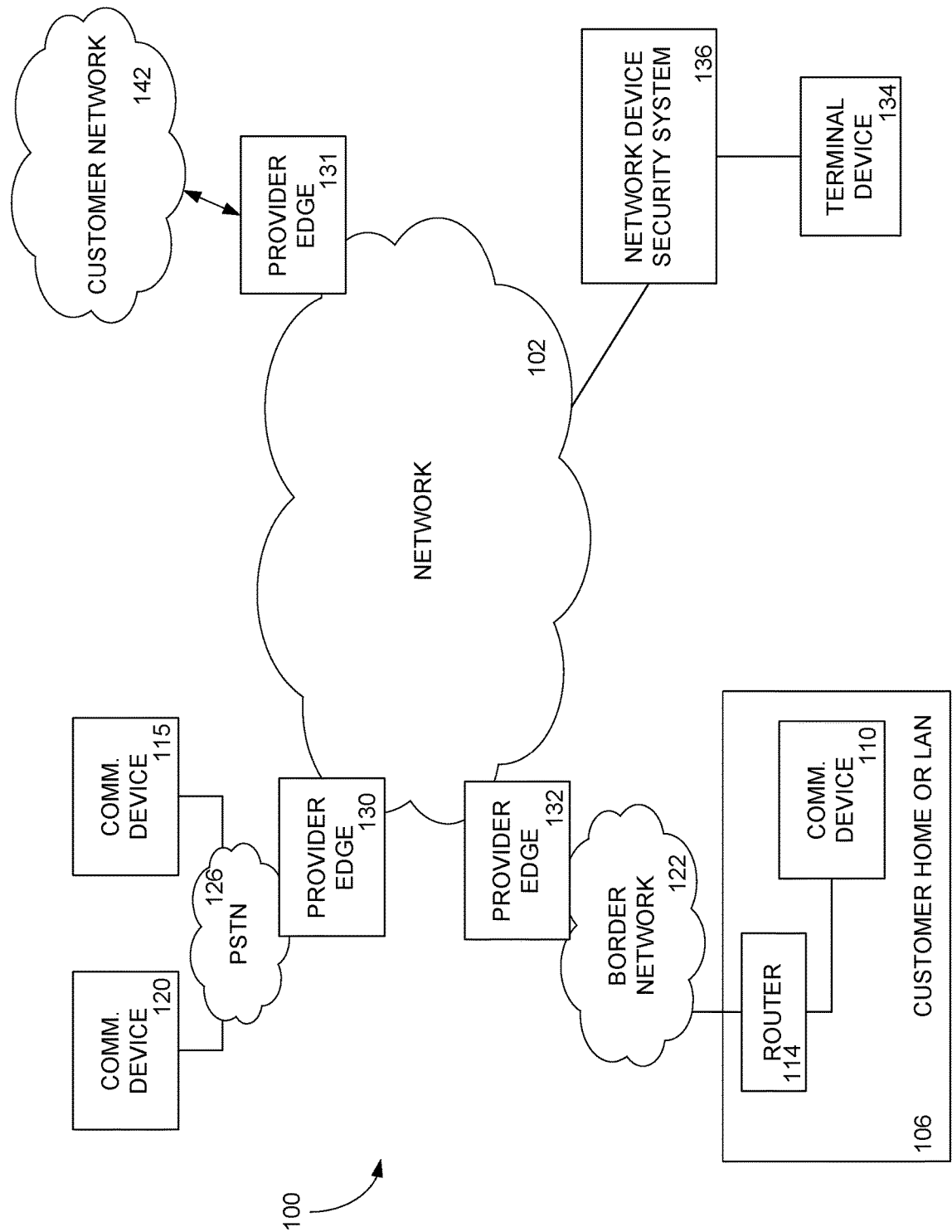
FIG. 1 schematic diagram illustrating an exemplary network environment in accordance with one embodiment.

Aspects of the present disclosure involve systems, methods, computer program products, and the like, for a network device security system that monitors and validates commands to network devices before such commands are executed. In one implementation, the network device security system receives and accumulates inputs, such as keystrokes, from a terminal or other computing device of a network management system, the inputs corresponding to a command to be executed at a network device. The network device security system may also receive and accumulate outputs from the network device intended for display on the terminal device in a network device accumulator. Upon receiving a return, execute, or similar control input from the terminal device, the network device security system may reproduce the command from the network device accumulator and interpret the reproduced command by comparing the reproduced commands to one or more lists of authorized and/or unauthorized commands. In certain implementations, such lists may include full commands, however, such lists may also include patterns, regular expressions, or the like to which the reproduced command may be compared. Upon authorization, the network device security system may provide the control input to the network device to execute the command. If the command is not authorized, the network device security system may delete the entered command and transmit an alert to the terminal that the command was not authorized. A log of command attempts from the terminal may also be stored in a secured server for analysis by a network administrator. In this manner, commands transmitted to the network device may be verified and authorized before being executed, preventing mistaken or unauthorized commands from being executed that may negatively impact the telecommunications network.

To determine which command attempts are authorized, the network device security system may receive a listing of authorized and unauthorized commands for the particular network device. In some instances, the list of authorized and unauthorized commands may be based on the user and/or particular characteristics of the user of the terminal device from which the commands are received. For example in certain implementations, information regarding a user's credentials, title, geographic location, or other characteristics may be stored for reference in a database or similar data source. Such information may then be used to determine which commands or lists of commands are authorized and/or unauthorized for a particular user. The lists of authorized and/or unauthorized commands may also be based on characteristics of the network device (e.g., the type of network device, the location of the network device within the network, the level of traffic handled by the network device) alone or in combination with the user characteristics. So, for example, a user may require a first level of permissions/credentials to execute commands on less critical equipment but may require a second, heightened, level of permissions/credentials to execute the same command on more critical equipment.

The list of authorized and unauthorized commands may be updated periodically from a command list server to ensure the lists are current and aligned with the security protocol of the telecommunications network. For example, network device security systems described herein may be implemented at multiple servers or locations throughout a network. Each such server may be configured to receive updates from the command list server and update a local version of the command lists whenever the command list server is updated. Alternatively, updating of the command list server may cause a redeployment or rebuild of the network device security system at each of the servers/locations. By maintaining the list of authorized and unauthorized commands at the network device security system, such verification and authorization of commands for a network device may occur even if communication with the command list server is interrupted.

Beginning with FIG. 1, one example of a telecommunications network configuration in accordance with the present disclosure is shown. In particular, FIG. 1 is a schematic diagram illustrating an exemplary network operating environment 100 in accordance with one embodiment. In general, the environment 100 provides for establishing communication sessions between network devices and for providing one or more network services. The environment 100 includes a primary network 102, which may be provided by a wholesale network service provider. Portions of the network 102 may include either of IP-based or non IP-based routing. Network 102 may include devices utilizing time division multiplexing (TDM) or plain old telephone service (POTS) switching and suitable components or devices for converting TDM and/or POTS-based traffic to some form of IP-based traffic The primary network 102 includes numerous components such as, but not limited to gateways and routers which enable communication and/or provide services across the primary network 102, but are not shown or described in detail here because those skilled in the art will readily understand these components.

The primary network 102 may be configured to interconnect multiple secondary networks, such as customer network 106 which can include communication devices such as, but not limited to, a personal computer 110 connected to a router/firewall 114. Although shown in FIG. 1 as computer 110, the communication devices may include any type of communication device that receives a multimedia signal, such as an audio, video or web-based signal, and presents that signal for use by a user of the communication device. For example, a VoIP telephone or VoIP enabled device may be used to facilitate communication through the network 102 with the public switched telephone network (PSTN). The communication and networking components of the customer network 106 enable a user at the customer network 106 to communicate through network 102 to other communication devices, such as the PSTN 126, the Internet 142, and/or other customer networks. Components of the customer network 106 are typically home- or business-based, but they can be relocated and may be designed for easy portability. For example, the communication device 110 may be a wireless (e.g., cellular) telephone, smart phone, tablet or portable laptop computer. In some embodiments, multiple communication devices in diverse locations that are owned or operated by a particular entity or customer may be connected through the network 102.

The customer network 106 typically connects to the network 102 via a border network 122, such as one provided by an Internet Service Provider (ISP). The border network 122 is typically provided and maintained by a business or organization such as a local telephone company or cable company. The border network 122 may provide network/communication-related services to their customers. In contrast, the communication device 120 accesses, and is accessed by, the network 102 via a public switched telephone network (PSTN) 126 operated by a local exchange carrier (LEC). Communication via any of the networks can be wired, wireless, or any combination thereof. Additionally, the border network 122 and PSTN 126 may communicate, in some embodiments, with the network 102 through respective provider edges 130, 132. For ease of instruction, only three communication devices 110, 115, 120 are shown communicating with the network 102; however, numerous such devices, and other devices, may be connected with the network 102, which is equipped to handle enormous numbers of simultaneous communications.

An operator of the network 102 may configure the network in any manner to facilitate the routing of communications through the network. For example, the network 102 may include a series of interconnected networking devices, such as routers and switches, that receive a communication, analyze the communication to determine a destination, and route the communication to a connected networking device to get the communication closer to a destination or egress point (such as provider edge 131). To determine which routes through the network to utilize to route a received communication or packet, components of the network may receive route information through one or more route announcing sessions between the devices. These route announcing sessions provide Layer 3 routing information between the components of the network and between different networks so that components of the telecommunications network 102 and other networks may determine how to route received communication packets.

One particular example of the announcement of Layer 3 routing information occurs in a Border Gateway Protocol (BGP) announcement. In general, BGP information (or BGP session, BGP feed or BGP data) involves a table of Internet Protocol (IP) prefixes which designate network connectivity between autonomous systems (AS) or separate networks. BGP information for a network route may include path (including next-hop information), network policies, and/or rule-sets for transmission along the path, among other information. The BGP feed may also include Interior Gateway Protocol (IGP) information for network routes within an Autonomous System (AS) or network and/or other network information that pertains to the transmission of content from the network. However, BGP information mainly describes routes used by the network 102 to connect to external networks or customers (such as border network 122 and virtual cloud environment 142) while IGP information describes routes through the network to connect one provider edge (such as provider edge 132) to another provider edge (such as provider edge 131) through a telecommunications network 102.

The network 102 is provided as an example to illustrate various aspects of telecommunications relevant to the present disclosure. Implementations of the present disclosure are not limited to the specific implementation illustrated in FIG. 1. Rather, the concepts discussed herein are more generally applicable to systems for managing and configuring devices within telecommunications networks, such as the network 102.

As mentioned above, the components of the telecommunications network 102 may be configured by one or more network administrators to perform the functions of providing communications between devices. In one implementation, the network administrators may log into or otherwise access the components of the network 102 to configure the components according to a network plan. For example, a network administrator may access a terminal device 134 that provides a connection to network devices of the network 102 and through which the administrator may provide commands to the network device. However, many network components execute commands provided to the device once accepted, even if such configuration may interrupt communication transmission through the network. Thus, the network environment 100 may further include, in some instances, a network device security system 136 to validate and authenticate commands provided to network 102 devices from the terminal 134 or other computing device to prevent unauthorized or mistaken configurations of devices within the network.

Figure 2:
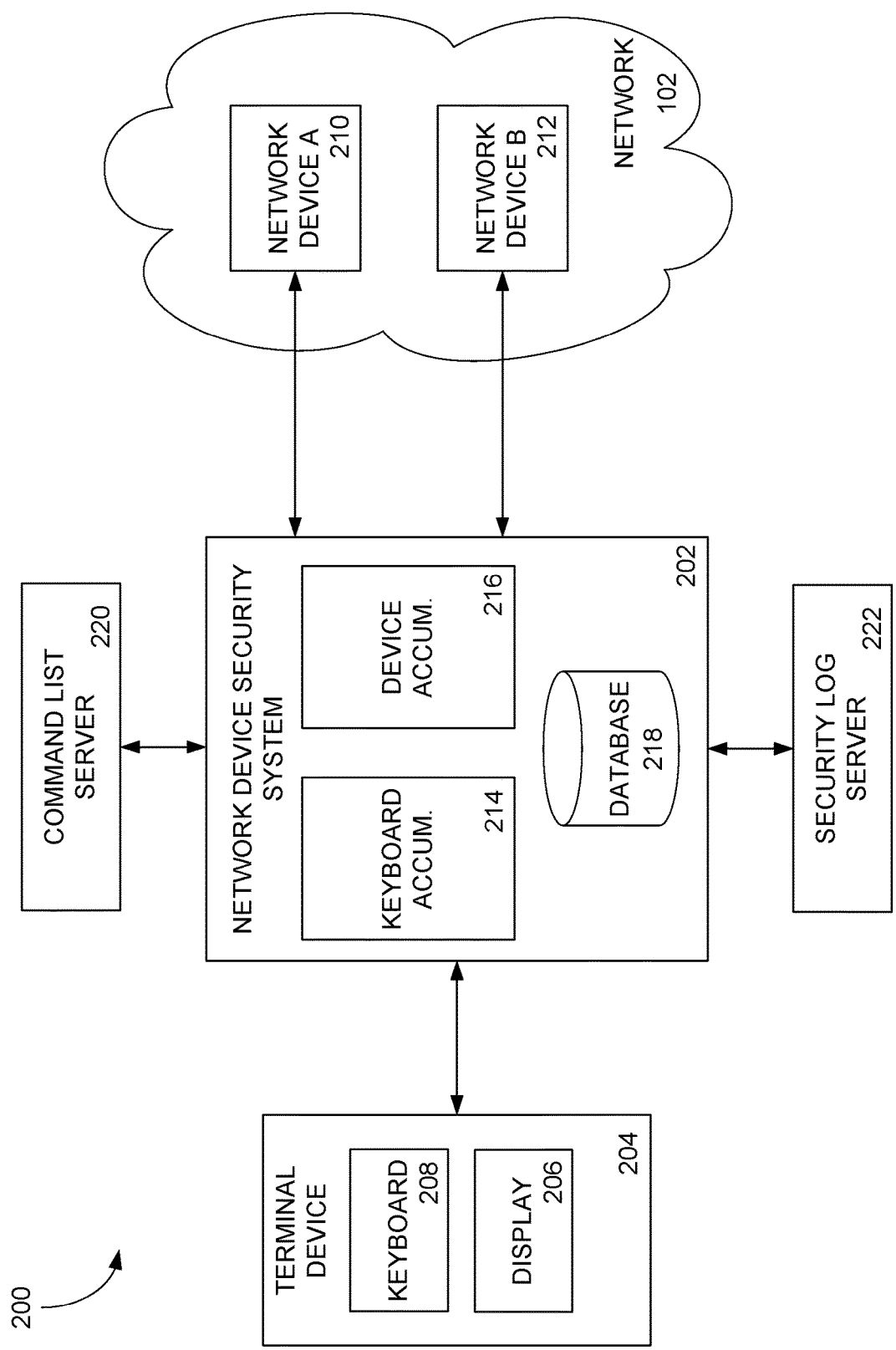
FIG. 2 is a schematic diagram illustrating a network device security system for managing one or more network devices of a telecommunications network.

FIG. 2 is a schematic diagram illustrating a network environment 200 including a network device security system 202 for managing one or more network devices 210, 212 of a telecommunications network 102. In general, the network device security system 202 communicates with a terminal device 204 and a telecommunications network 102. In certain implementations, the terminal device 204 may be a NOC terminal, however, the term "terminal device" as used herein is intended to more generally refer to any computing device configured to access and exchange data with the one or more network devices 210, 212, as described herein. As discussed in more detail below, the network device security system 202 may receive commands (such as configuration commands) intended for one or more devices 210, 212 of the telecommunications network 102 to verify and authenticate the commands. As such, the network device security system 202 may provide security in network configuration by identifying and preventing unauthorized commands that may negatively impact the operation of the network from being executed at the network devices 210, 212.

As discussed, the network device security system 202 communicates with a terminal device 204 to provide commands to network devices. The terminal device 204 typically includes at least a display device 206 for displaying outputs from the network devices 210, 212 and a keyboard 208 for providing input commands to the devices. Other output devices and input devices of the terminal device 204 may also be included in the network environment 200 of FIG. 2. The terminal device 204 is generally any form of computing device capable of interacting with the network device security system 202, such as a personal computer, terminal, workstation, portable computer, mobile device, smartphone, tablet, multimedia console, etc. Accordingly, the term "keyboard", as used herein, is intended to cover both physical keyboards and virtual keyboards, such as a keyboard presented on a display and that may be interacted with using a touchscreen, mouse, or other input device. Moreover, the term "keyboard" should not be considered to be limited to any particular keyboard having a particular arrangement of keys. Rather, the term should be understood to refer more broadly to any input device for providing character and control inputs that may be transmitted to a network device, such as the network devices 210, 212 of FIG. 2.

Although described herein as receiving inputs from a "user", it should be appreciated that applications of the present disclosure include commands that are input directly by a user (e.g., by typing commands into the terminal device 204) or by a script executable on the terminal device 204 and configured to provide one or more commands. Such scripts may include those executed by a user or automatically by one or more computing systems. Accordingly, to the extent this disclosure discusses commands sent by the terminal device 204, such commands are not limited to those directly typed by a user using a keyboard or similar device.

The network device security system 202 may also communicate with the telecommunications network 102. In particular, the network device security system 202 may communicate with any component of the network 102, including but not limited to, network device A 210 and network device B 212. In general, the terminal device 204 utilizes the connection to the telecommunications network 102 to log into or otherwise access the network devices 210, 212 to provide commands or otherwise interact with the devices. Thus, the terminal device 204 may log into network device A 210 to configure portions of the device at a first time and log into network device B 212 through the terminal device 204 at a second time to receive device parameter information. In some implementations, the terminal device 204 may be utilized to log into network device A 210 and network device B 212 simultaneously, although typically commands may be sent to one device at a time to ensure proper command execution by the devices of the network.

As discussed in more detail below, the network device security system 202 may include a keyboard accumulator 214 and a device accumulator 216. In general, the keyboard accumulator 214 is a list or other type of collection of inputs, commands, keystrokes, American Standard Code for Information Interchange (ASCII) characters, and the like received from the keyboard 208 (or other input device of the terminal device 204). The device accumulator, on the other hand, is a list or other type of collection of inputs, commands, keystrokes, ASCII characters, and the like received from the network devices 210, 212 with which the terminal device 204 is communicating, generally for display via the display device 206. In some implementations, the accumulators 214, 216 may limit the number of characters/inputs maintained in the accumulators from the keyboard 108 and/or the network devices 210, 212. A database 218 for storing authenticated commands, user information, network information, or any other information utilized in the operation of the network device security system 202 may also be included.

In some implementations, the network device security system 202 may communicate with a command list server 220. In general, the command list server 220 stores or otherwise maintains a list of authorized commands (a "whitelist") and/or a list of unauthorized commands (a "blacklist") for the network devices 210, 212. Such lists may be generated by administrators of the network 102 or automatically generated by one or more computing devices of the network. As discussed in more detail below, the authorized commands list and/or unauthorized commands list may be transferred to the network device security system 202 for storage in the database 218 for use during operation. If the command lists maintained by the command list server 220 are updated or otherwise modified, a corresponding update may be provided to the network device security system 202 such that the database 218 is current. Alternatively, the command list server 220 may provide lists of authorized and/or unauthorized commands during initial deployment/distribution of instances of the network device security system 202. In such implementations, updates to the command lists maintained by the command list server 220 may cause subsequent redeployment or rebuilding (in whole or in part) of the instances of the network device security system 202. In addition, the network device security system 202 may be in communication with a security log server 222 configured to receive logs from one or more network device security systems and store such logs for analysis by an administrator or monitoring system.

Although depicted in FIG. 2 as being separate from the terminal device 204 and the network 102, it should be appreciated that the network device security system 202 may be implemented in any component of the environment 200 of FIG. 2 or any other computing device. Thus, in some implementations, the network device security system 202 is a program or other system embodied within the terminal device 204. Similarly, the network device security system 202 may be included in a computing device of the network 102. In general, the network device security system 202 may be typically included in a NOC environment for a telecommunications network 102 that sits between the terminal device 204 and the network 102. Because the network device security system 202 receives input from the terminal device 204, it may be advantageous to include the network device security system in the terminal device or within a virtual private network that includes the network device security system. Regardless of which computing device includes the network device security system 202, the system operates to verify and authenticate commands intended for a target network device of the network 102 to configure or manage the target network device.

Figure 3A:
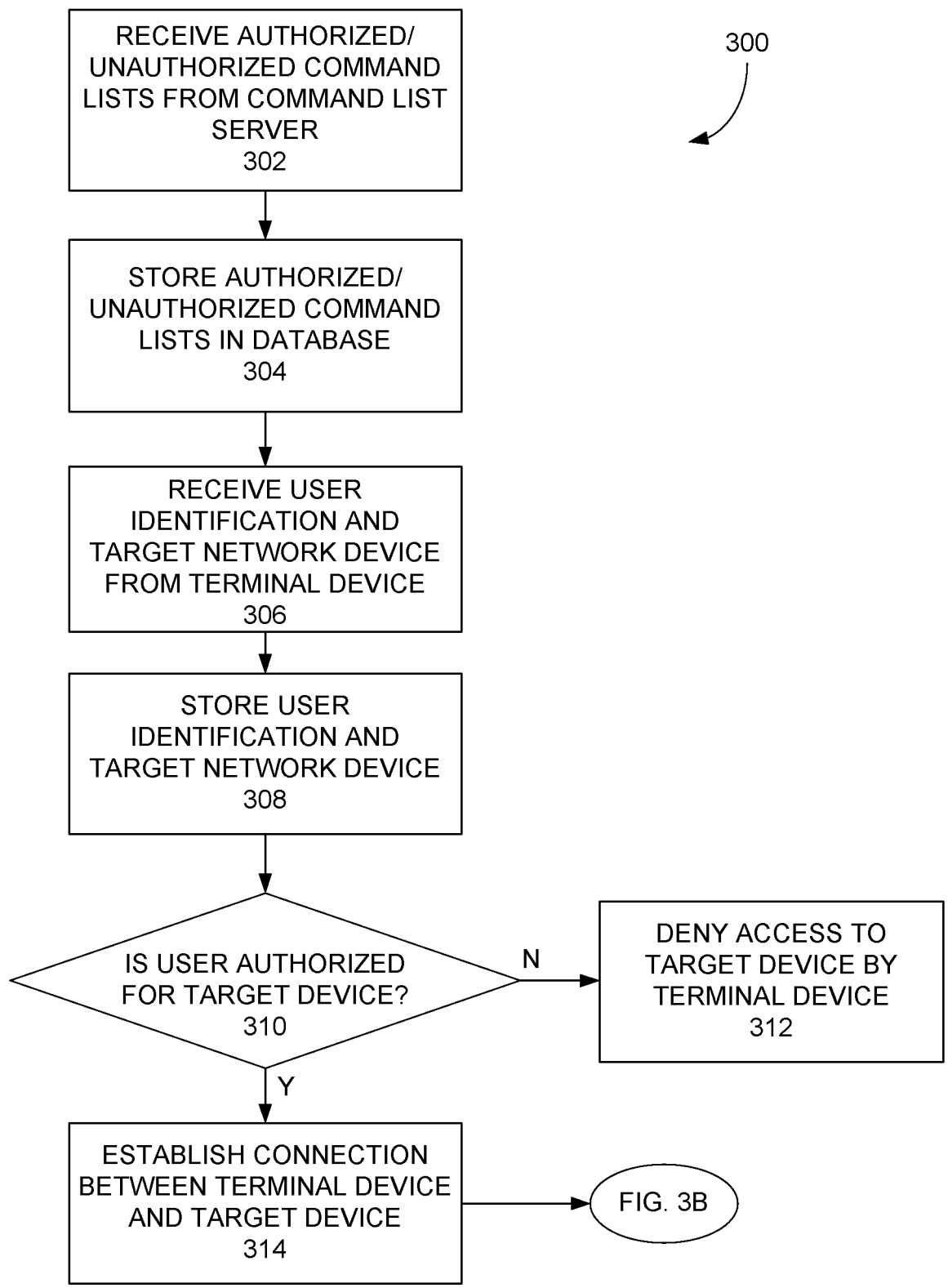
FIGS. 3A-3B illustrate a flowchart of a method for activating a network device security system for managing one or more network devices of a telecommunications network.
Figure 3B:
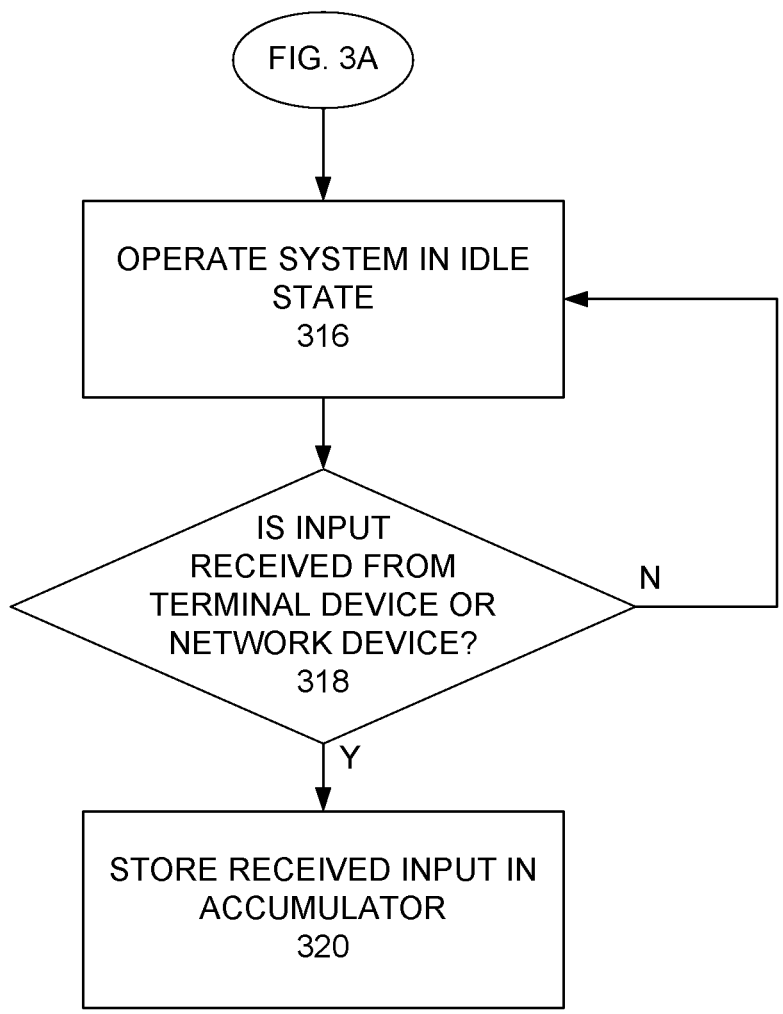

Turning now the flowchart of FIGS. 3A and 3B, the operation of the network device security system 202 is described. In general, the flowchart illustrates a method 300 for activating a network device security system 202 for managing one or more network devices 210, 212 of a telecommunications network 102. The operations of the method 300 may be performed by the network device security system 202, although other computing devices included in or in communication with the system 200 of FIG. 2 may perform one or more of the operations. Through the method 300, the network device security system 202 may initialize and begin providing secure transmissions of commands to one or more network devices 210, 212 of the telecommunications network 102 to enhance the operation and stability of the network. For purposes of the following discussion, the network device 210 is considered the target network device for execution of one or more commands provided by the terminal device 204.

Beginning in operation 302, the network device security system 202 receives one or more lists of authorized/unauthorized commands from the command list server 220. In general, the authorized and unauthorized command lists provide a listing of commands authorized and unauthorized for execution at network device of the network 102, including the network device 210. In some implementations, the authorized commands and the unauthorized commands may be maintained as separate lists. Further, the lists may be tailored or otherwise based on the network device type and/or the user attempting to configure the network device. For example, a list of authorized commands may be associated with a particular type of device of the telecommunications network 102. The type of device may be based on the manufacturer of the device, a relative location or position within the network 102 of the device, the amount of traffic carried by the device, or any other characteristic of the device. In addition to or as an alternative to the command lists being based on the type of network device, the command lists may also be based on specific users or groups of users of the terminal device 204. For example, a first list of authorized and unauthorized commands may be applicable for field technicians, while a second list of authorized and unauthorized commands may be applicable for network engineers or administrators. Thus, a first user may be authorized to execute a first set of commands while a second user may be authorized to execute the some or all of the first set of commands as well as a second set of commands. In this manner, the authorized and unauthorized commands lists may be based on device type (or other device characteristics), network configuration, and/or user identification.

Further, in one implementation, the authorized and/or unauthorized commands lists may include command types or groups of commands that are authorized or unauthorized. For example, the lists may include one or more wildcard characters within a command listing (e.g., "show *", where "*" is a wildcard) that is used to capture multiple variations of a similar command (e.g., all "show" commands regardless of the parameters provided). The wildcard characters or groups of commands may be used to reduce the size of the command lists. When a received command is compared to the command lists, the network device security system 202 may consider the received command as being included in the list when all or a portion of the command is listed.

In certain implementations, the command lists may be implemented as a list of strings, regular expressions, or other search patterns that may be used to test or otherwise verify commands. For example, in certain implementations, the list may include a collection of regular expressions expressed using Perl Advanced Regular Expressions. It should be appreciated that any such search patterns may be applied to any part of the command including parameters that are provided with the command.

Upon receipt of the authorized and/or unauthorized commands lists, the network device security system 202 may store the lists in the database 218 (or any similar data source) in operation 304. In some instances, the network device security system 202 may requests the lists from the command list server 220 to update the database 218 with the lists. In other implementations, the command list server 220 may provide the lists periodically to the network device security system 202 or upon receiving an updated command list. The lists may be provided to or edited within the command list server 220 by an administrator of the telecommunications network 102 at any time, such as in response to adding a new user to the system 200 or when a new device type is added to the network 102. Upon updating at the command list server 220, the updated list may be provided or transmitted to the network device security system 202 for storage. In some instances, the network device security system 202 may replace an old command list in the database 218 with a newly received list for use in determining authorized or unauthorized commands for network devices.

As discussed above, operations 302 and 304 include retrieving lists of authorized and/or unauthorized commands from the command list server 220 and storing such lists locally in the network device security system 202. Such an approach may be advantageous in certain cases as it allows the network device security system 202 to have access to the lists of commands if the network device security system 202 is unable to communicate with the command list server 220. Nevertheless, in other implementations of the present disclosure, the network device security system 202 may instead access lists of authorized and unauthorized commands stored at the command list server 220 without storing such lists in the network device security system 202.

In operation 306, the network device security system 202 receives some form of user identification and a target network device from the terminal device 204. For example, the user may input, select, or otherwise provide (e.g., using a mouse, keyboard, touchscreen, or other input device of the terminal device 204) particular identifying information to the terminal device 204 in order to access one or more devices of the network 102. Such information may include, but is not limited to, a user identifier and a password. In this example, the user identifier may be transmitted or otherwise provided to the network device security system 202 such that the system may identify the particular user of the terminal device 204. Further, upon accessing the network management system, a user of the terminal device 204 may provide an indication of the particular network device of the telecommunications network 102 to which the user intends to provide commands from the terminal device. For purposes of the current discussion only, it is assumed that the network device of interest is the network device 210 of FIG. 2. For example, the user may input, select, or otherwise provide an Internet Protocol (IP) address of the network device 210 or any other network ID or address of the network device 210. The network device security system 202 may then determine which device of the network 102 the user intends on configuring through the terminal device 204. As explained in more detail below, the user identification information and the network device 210 may be utilized by the network device security system 202 to determine which list of authorized and/or unauthorized commands should be retrieved from the database 218 and used to verify an entered command.

In operation 308, the network device security system 202 may store the user identifier and network device 210, such as in the database 218. In operation 310, the network device security system 202 may determine if the user is authorized to configure or manage the network device 210 by comparing the user identifier to a list of authorized users (e.g., technicians, managers, administrators, etc.) of the network device 210. If the user is not authorized, the network device security system 202 may deny access to the network device 210 in operation 312. The network device security system 202 may also provide a deny message to the terminal device 204 for display in the display device 206 alerting the user that access to the network device 210 is denied. In some implementations, however, the authorization for the user to manage or access the network device 210 may be performed by the terminal device 204.

Regardless of which components of the system 200 perform the operations, the network device security system 202 may establish a connection between the terminal device 204 and the network device 210 in operation 314 if the user is authorized to access the device. The connection between the devices may occur through the telecommunications network 102, or may be established over a separate network or link between the terminal device 204 and the network device 210. Upon connection between the devices, the network device security system 202 may enter an idle state in operation 316. In the idle state, the network device security system 202 consumes minimal resources and remains idle until an input is received from either the terminal device 204 or the network device 210 (operation 318). As long as no input is received from either the terminal device 204 or the network device 210, the system 202 remains in the idle state. However, upon the receipt of some input, the system awakens in operation 320 and begins storing keystrokes or other inputs from the terminal device 204 and/or the network device 210 in the accumulators 214, 216, respectively.

Figure 4A:
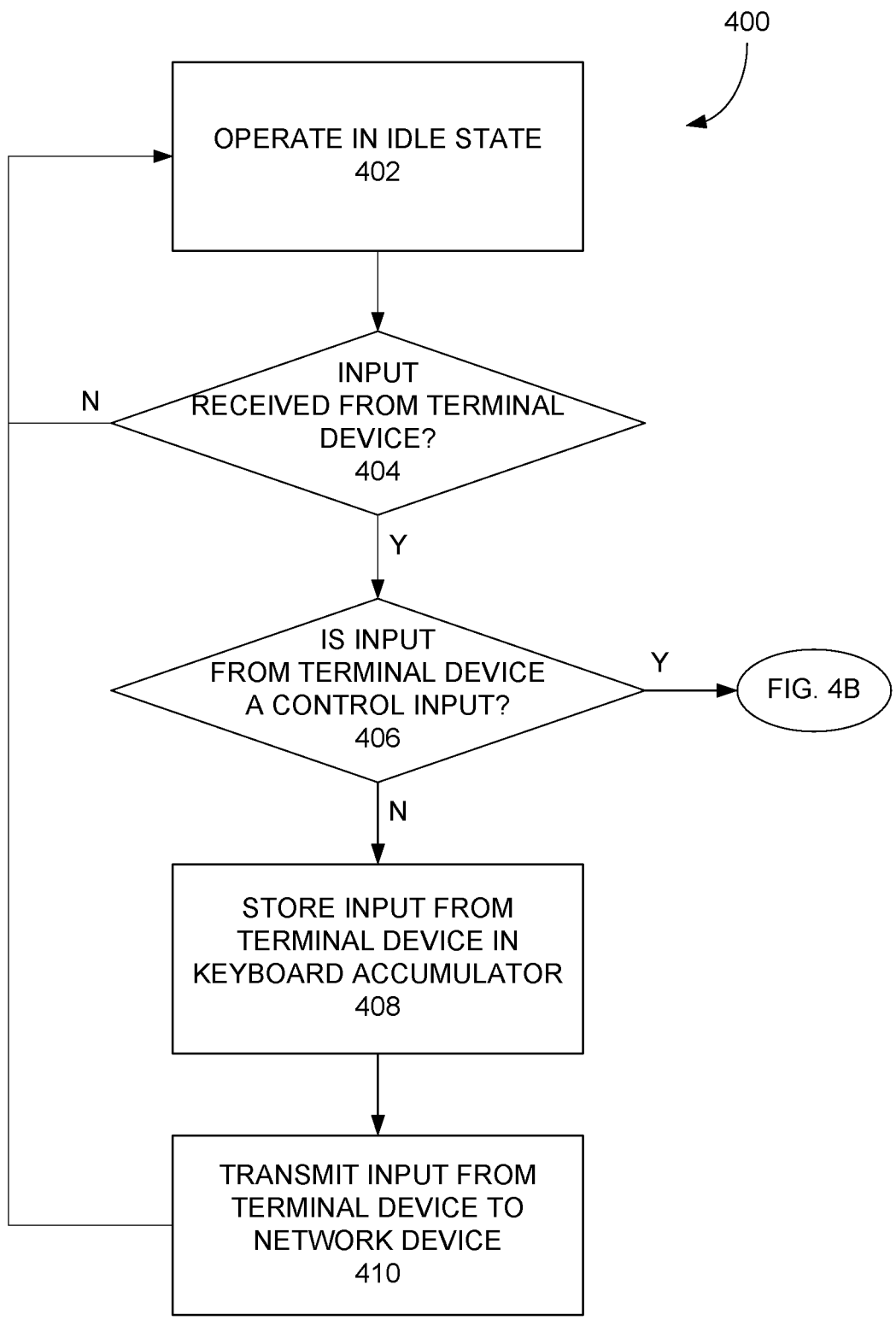
FIGS. 4A-4C illustrate a flowchart of a method for verifying and authorizing commands to a network device of a telecommunications network.
Figure 4B:
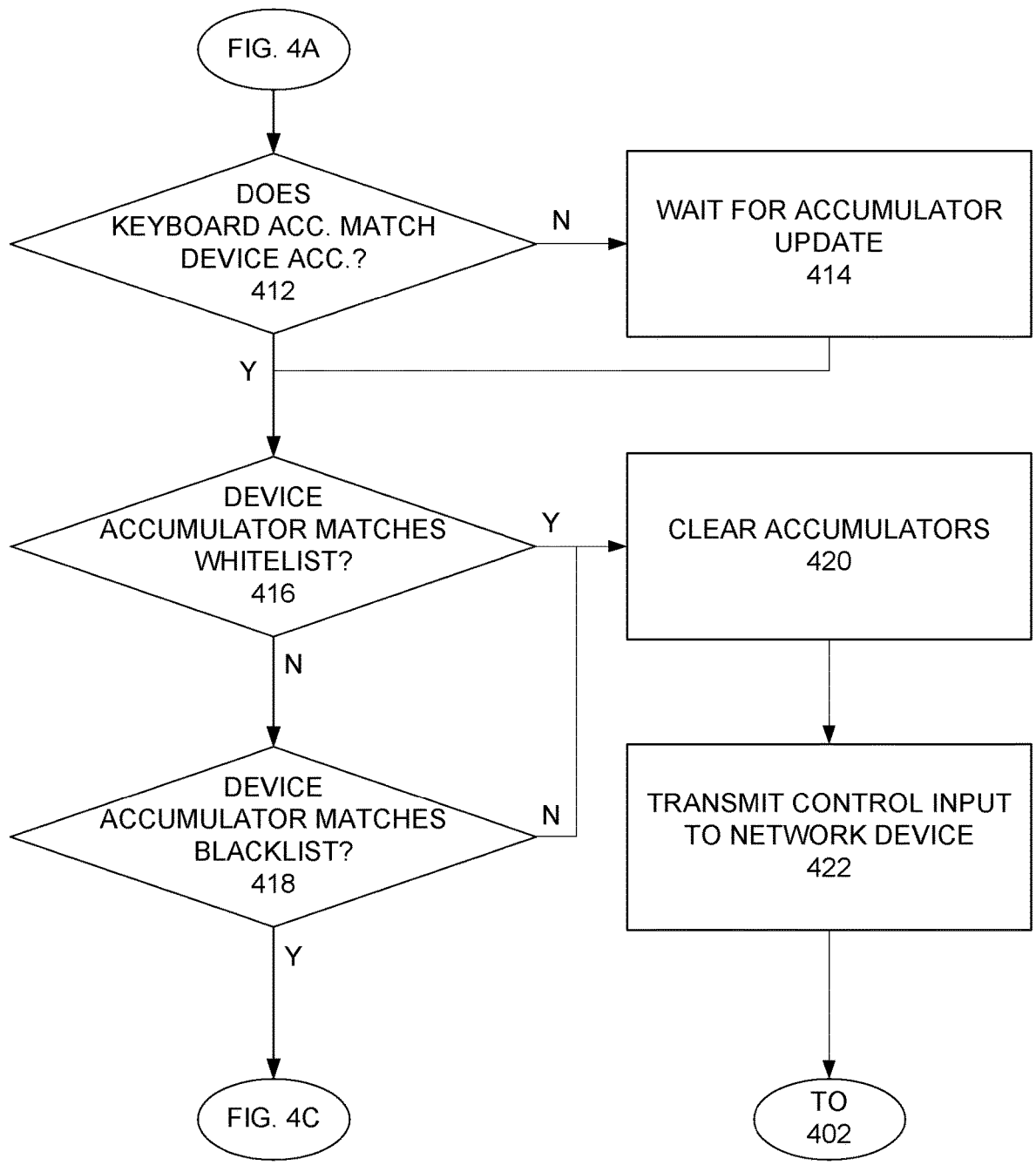
Figure 4C:
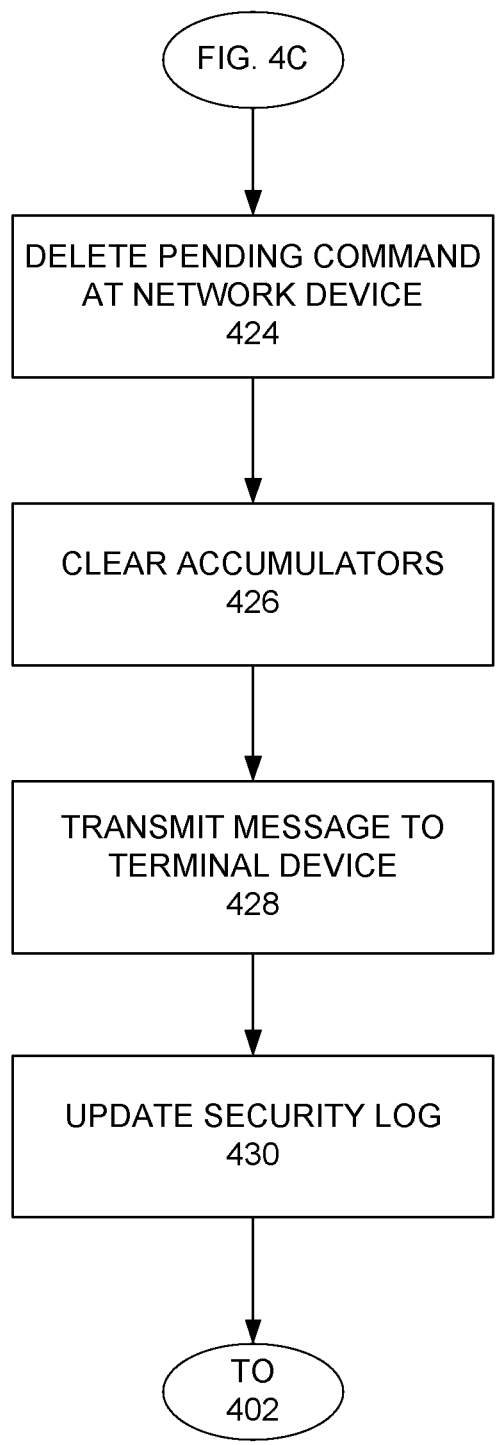

Upon receiving an input to the network device 210, the network device security system 202 may perform the method 400 illustrated in FIGS. 4A-4C. In general, FIGS. 4A-4C illustrate a flowchart of a method 400 for verifying and authorizing commands to a network device of a telecommunications network, which for purposes of the following example is considered to be the network device 210 of FIG. 2. The network device security system 202 performs the method 400 in response to receiving input intended for the network device 210, the method 400 preventing, among other things, unauthorized configuration of the device in a manner that may negatively affect the operation of the telecommunications network 102. In some instances, other devices or components of the system 200 of FIG. 2 may perform one or more of the operations of the method 400. Reference is also made in the following discussion to FIG. 5, which is a flow chart illustrating a method 500 for receiving output from the network device 210 at the network device security system 202 for delivery and display at the terminal device 204.

Referring first to the method 400 of FIGS. 4A-4C and beginning in operation 402, the network device security system 202 begins in an idle state, waiting for input from the terminal device 204. As indicated by the loop between operation 402 and operation 404, the network device security system 202 remains in the idle state until an input is received from the terminal device 204. When an input is received, the network device security system 202 determines whether the input corresponds to a control input (operation 406). If the input does not correspond to a control input, the network device security system 202 stores the input from the terminal device 204 in a keyboard accumulator (operation 408). As explained above, such inputs may be received from any input device of the terminal device 204 and may generally correspond to instructions to be executed by the network device 210. Further, the inputs may include any type of computing input, such as keyboard strokes, ASCII characters, editing instructions, etc. Notably, for purposes of the present disclosure, the term "character" is intended to include any of alphanumeric characters, punctuation marks (including, without limitation, spaces and tabs), or editing characters (including, without limitation, deletions, backspaces, and characters for moving the position of a cursor). The network device security system 202 stores the received character in the keyboard accumulator 214 of the system 202 in a manner that the characters may be retrieved by the system 202 to recreate a command intended for the target device 210. For example, the accumulator 214 may be a first-in, first-out (FIFO) storage scheme such that the network device security system 202 may read the characters out of the accumulator one at a time and put the characters together to reproduce a command. The reproduction of the command from the accumulator 214 is described in more detail below.

In operation 410, the network device security system 202 transmits the input received from the terminal device 204 to the network device 210. Thus, the network device security system 202 may operate as a pass-through system that transmits inputs at the terminal device 204 to the network device 210. The input is transmitted through network 102 to the network device 210 and potentially evaluated by the network device 210. Upon receipt, the network device 210 may analyze the input and transmit a return to instruct the terminal device 204 to display the entered input or character. For example, if the user of the terminal device 204 types an "r" character into the keyboard 208, the "r" character is received at the network device security system 202 and stored in the keyboard accumulator 214. Further, the network device security system 202 transmits the "r" character to the network device 210 over the telecommunications network 102 or other network.

In response to receiving a character from the network device security system 202, the 202, the network device 210 may transmit one or more characters for display at the display device 206 of the terminal device 204. For example, in the previous example, in response to receiving an "r" character from the network device security system 202 to display an "r" character on a display of the display device 206 at the cursor position of the display device 206. In certain cases, the network device 210 may respond to receiving a character by sending multiple characters or even multiple lines of characters to the display device 206. For example, in response to receiving an up arrow character, the network device 210 may return a previous line command or previous line of text.

Figure 5:
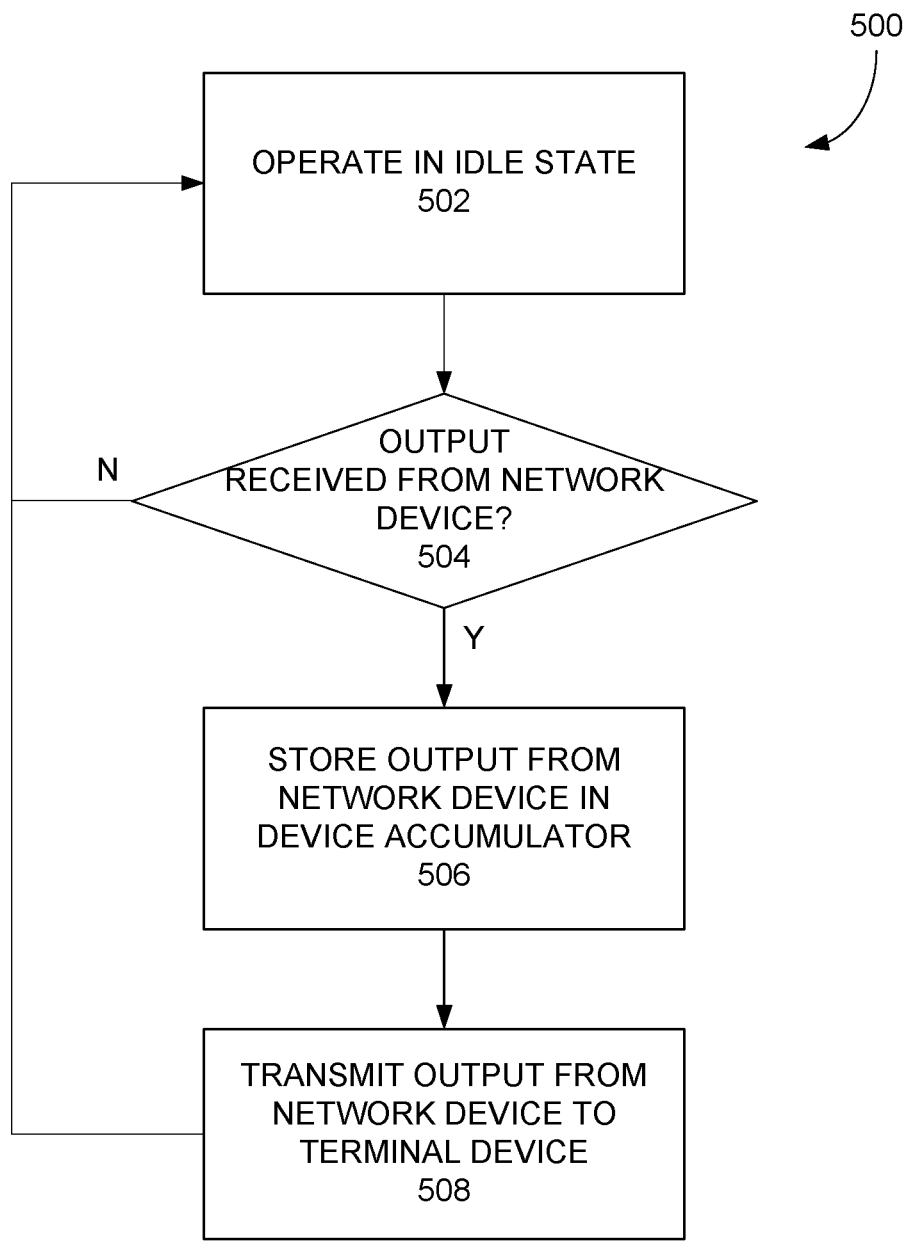
FIG. 5 illustrates a flowchart of a method for receiving and processing characters or instructions from a network device for display.

Referring now to the method 500 of FIG. 5, the network device security system 202 may remain in an idle state (operations 502, 504) until the network device security system 202 receives output, such as characters, or display instructions from the network device 210 intended for display at the display device 206. In response to receiving such characters, the network device security system 202 stores the characters in the device accumulator 216. Using the previous example, the network device security system 202 may receive an ASCII character "r" and store the character in the device accumulator 216. Similarly, the network device security system 202 may receive an instruction to display an "r" character (i.e., the output resulting from the instruction) and may store the "r" character in the device accumulator 216. After updating the device accumulator 216 (operation 506), the network device security system 202 may then forward the character to be displayed on the display device 206 (operation 508) before returning to the idle state to await additional output from the network device 210.

By executing operations 402-410 of FIG. 4A and operations 502-508 of FIG. 5, both the keyboard accumulator 214 and the device accumulator 216 include the input "r". As should be appreciated, there may be some delay in the transmission of the character to the network device 210 and receiving the returning display instruction such that the character "r" may not appear on the display 206 until after the delay.

The above operations may continue for several characters entered by the user in the terminal device 204. For example, if the user is inputting a "reboot" command, the user may follow the "r" character with typing characters "e", "b", "o", "o", and "t". Each of these characters is, in the order received, stored in the keyboard accumulator 214 and transmitted to the network device 210. A return character received from the network device 210 for display for each of the transmitted characters may also be stored in the device accumulator 216 and transmitted to the terminal device 204 for display.

Referring back to operation 406, the network device security system 202 may receive a control input from the terminal device 204. In general, the control input indicates to the network device 210 to execute the typed command. Thus, following the above example, the command "reboot" may be typed by the user of the terminal device 204 followed by a control input (such as a carriage return) to execute the reboot command at the network device 210. As long as a control input is not received, the network device security system 202 returns to operation 402 and repeats the above operations. However, upon receiving the control input, the network device security system 202 continues to operation 412 where the network device security system 202 may compare the contents of the keyboard accumulator 214 to the contents of the device accumulator 216. More specifically, the contents of the keyboard accumulator 214 are compared to the contents of the device accumulator 216 to determine if they represent the same command.

The contents of the keyboard accumulator 214 and the device accumulator 216 may not be exact matches for several reasons. First, the keystrokes entered by a user (or provided by a script) may not be the exact same as the characters or instructions received from the network device 210. For example, although the user may incorrectly type the string "reboot" by omitting the "b". The user may then press the backspace key three times followed by retyping the string "boot" such that "reboot" is correctly input. The keyboard accumulator 214 may store each of the backspaces as distinct characters. In contrast, the network device 210 may return characters or instructions that are stored in the device accumulator 216 and that replace each backspace provided by the user with a sequence of a first back arrow, a space, and a second back arrow. The end result of the characters or instructions received from the network device 210 is the display of the string "reboot" at the terminal device 204. Accordingly, in certain situations, the exact contents of each of the keyboard accumulator 214 and the device accumulator 216 may vary even though the net result of the contents may be the same. As a result, the comparison operation of 412 may include comparing the results of the characters and instructions stored within the accumulator 214, 216 as opposed to directly comparing the contents of the accumulators 214, 216.

Another situation in which the contents and/or results of the contents of the accumulators 214, 216 may arise due to latency. More specifically, a delay exists between the time a keystroke or character is added to the keyboard accumulator 214 and the time at which a corresponding return character from the network device 210 is added to the device accumulator 216. As a result of this delay, the contents and/or result of the contents of the accumulators 214, 216 may differ until the device accumulator 216 is updated.

To account for such discrepancies, a predetermined delay may be applied by the network device security system 202. In the method 400, for example, if the accumulators 214, 216 are found not to match, the network device security system 202 may wait for some period of time (operation 414) before comparing the accumulators 214, 216 again. Although not illustrated in FIGS. 4A-4C, the network device security system 202 may be configured to generate an error, halt or abort operations, or take other similar actions if the accumulators 214, 216 do not match after a certain length of time, a certain number of comparisons, or some other suitable condition. In other implementations, a delay may be instead be applied immediately after a control input is identified (e.g., between operations 406 and 412) to allow for a return character or instruction to be received from the network device 210 prior to checking whether the accumulators 214, 216 include matching commands.

After the delay period has elapsed, the network device security system 202 may access the device accumulator 216 and reproduce the command pending at the network device 210 based on the contents of the device accumulator 216. Alternatively, the process of reproducing the command from the contents of the device accumulator may be incorporated into the process of comparing the keyboard accumulator 214 to the device accumulator 216. To reproduce the command pending at the network device 210, the network device security system 202 may read out the characters or inputs stored in the device accumulator 216 and generate a reproduced command conforming to each output of the network device 210 intended for display at the terminal device 202. In some implementations, the device accumulator 216 may store two or more lines of text identifiable through a return input that offsets or delineates the lines within the accumulator 216. Thus, the network device security system 202 may reproduce the last command provided and stored in the accumulator 216, ignoring or disregarding those characters stored in the accumulator 216 beyond the last received return input. In some instances, however, the network device 210 may utilize all lines of characters stored in the accumulator 216 to determine the command to be executed. In these instances, the network device security system 202 may retrieve all of the characters or inputs in the device accumulator 216 to reproduce the pending command to the network device 210.

Upon reproduction of the pending command from the data stored in the device accumulator 216, the network device security system 202 may determine in operations 414 and 416 if the command is authorized for the particular user. For example, in certain implementations the network device security system 202 may determine each of the current user of the terminal device 204 (e.g., through the user identification information stored by the network device security system 202) and/or the network device 210 type (e.g., through the device type information stored by the network device security system 202). Based on such information, the network device security system 202 may access an authorized command list (e.g., a "whitelist" of commands) stored in the database 218. In some instances, the authorized command list may be particular to the network device type and the identified user of the terminal device 204. In other instances, the authorized command list may be general to all components of the network, to a subset of components of the network, to all authorized users, to all users of the network 102, etc. As explained above, the authorized command list is provided to the network device security system 202 from the command list server 220.

To determine if the pending command is authorized, the network device security system 202 may compare the reproduced command to each of the commands listed in the authorized command list (operation 416). As mentioned, some entries in the authorized command list may be general commands that encompass a variety of possible commands. For example, a command may include the character string "reboot/port A", with port A being a particular port of the network device 210. The authorized command list for the device and the user may include an entry that allows for commands "reboot/port *", with "*" being a wildcard character such that character may be included in the command at that position. Thus, the network device security system 202 may compare the reproduced command "reboot/port A" to the list of authorized commands and determine that commands with the form "reboot/port *" are authorized for that device type and user. Any manner of comparison of the reproduced command and the authorized command list may be performed by the network device security system 202 to determine if the command is authorized.

Upon validating that the pending command is included in the authorized command list, the network device security system 202 may clear the accumulators (operation 420) and transmit the control input (e.g., a carriage return character) to the network device 210 (operation 422). This may operate to execute the pending command at the network device 210. In operation 418, the network device security system 202 may begin receiving inputs from the network device 210 in response to the entered command. For example, the entered command may be a request for configuration information from the network device 210, such as version number or port configuration. This information may then be transmitted from the network device 210 to the terminal device 204, with the information being stored in the device accumulator 216. However, the network device security system 202 may be configured, in some instances, to monitor the received device inputs for a particular string that indicates a prompt has been returned by the network device 210. The prompt indicates that the network device 210 has completed providing the requested information to the terminal device 204 and is waiting for the next command to be entered. Upon recognizing the prompt from the network device 210, the network device security system 202 may return to operation 402 to begin storing the next received inputs from the terminal device 204 or, in some instances, to the idle state of operation 316 to await the next input from the user at the terminal device.

If, on the other hand, the pending command is not included in the authorized command list, the pending command may be compared to a list of unauthorized commands (e.g., a "blacklist" of commands) (operation 418) to determine whether the pending command is banned or otherwise unauthorized for the particular user and/or network device. In the implementation illustrated in FIG. 4B, of the pending command is not included in the unauthorized command list, the pending command may be assumed to be permitted. As a result, the accumulators may be cleared (operation 420) and the control input may be transmitted to the network device 210 (operation 422).

The process of comparing the pending command to a whitelist of commands and then a blacklist of commands is just one example implementation of an authorization process that may be implemented in applications of the present disclosure. In other implementations, the authorization process may include comparing the pending to command to either or both of a whitelist or a blacklist in any order. Moreover, the example implementation of FIG. 4 assumes that any command not included in either of the whitelist or blacklist is permitted. In other implementations, such unidentified commands may instead be assumed to be unauthorized.

In certain implementations, the network device security system 202 may also determine whether the pending command is in a proper form for the network device 210. For example, the reproduced command may include one or more typos or other mistakes that the network device 210 may simply not recognize as a proper command. If the reproduced command is in a proper form as determined by the network device security system 202, the system may proceed at normal to operations 420 and 422. In other implementations, the network device security system 202 may simply provide the control input to the network device 210 regardless of the form of the reproduced command. In other words, as long as the command is authorized by being included in the whitelist or excluded from the blacklist, the control input is provided to the network device 210. The network device may then determine if the reproduced command is in a proper form and, if not, may return an alert or appropriate message indicating the improper form to the terminal device 204.

If the reproduced command is not authorized or if the reproduced command is not in a proper form, the network device security system 202 may execute various remedial operations. For example, in operation 424, the network device security system 202 may transmit one or more deletion commands to the network device 210 to remove the pending command at the network device 210. In one example, the network device security system 202 may transmit backspace inputs to the network device 210 for the number of characters included in the reproduced command. These deletion commands may operate to remove the pending command from the network device 210. Further, in response to the deletion, the command displayed at the terminal device 204 may also be deleted as acknowledgement messages are returned from the network device. Further, in operation 426, the network device security system 202 may clear each of the accumulators 214, 216. The network device security system 202 may also transmit an alert to the terminal device 204 for display on the display device 206 (operation 428). The alert may, for example, provide a message to the user of the terminal device 204 that the user is not authorized to execute the pending command at the network device 210. In cases where the command is in an improper form, the message may instead indicate that the reproduced and/or the pending command was not recognized or otherwise improper.

In some implementations, the network device security system 202 may update a security log (operation 430). The attempt may be noted in the security log for review and analysis by a network administrator. The security log thus provides a history of the type and number of commands attempted to be executed on the network 102. Upon transmission of the command execution attempt to the security log, the network device security system 202 may return to the idle state of operation 402 to begin monitoring for inputs from the terminal device 204. Entries for the security log may include, among other things an identifier corresponding to the current user of the terminal device 204, the attempted command, an identifier corresponding to the network device at which the command was attempted, a timestamp, or any other similar information regarding the attempted command.

Although not included in the method 400 of FIGS. 4A-4B, it should be appreciated that log entries, such as generated in operation 426 in response to an unauthorized command, may be generated under other circumstances. For example, a log entry may be generated for any attempted command regardless of whether the command is authorized, unauthorized, or unidentified. Such log entries may similarly include, among other things, the attempted command, an identifier corresponding to the network device at which the command was attempted, a timestamp, an indicator corresponding to whether or not the command was authorized, or any other similar information regarding the attempted command.

Through the methods 300, 400 discussed above, the secure network device management system 202 may monitor and validate configuration or other commands to network devices before such commands are executed. In one implementation, the network device security system receives and accumulates inputs or keystrokes from a terminal or other computing device of a network management system intended for a network device. The network device security system may also receive and accumulate inputs from the network device intended for display on the terminal. Upon receiving a return or execute instruction from the terminal device, the network device security system may reproduce the pending command from the accumulators and compare the reproduced command to a list of authorized or unauthorized commands. Upon authorization, the network device security system may provide the execute command to the network device to execute the pending command. If the command is not authorized, the network device security system may delete the pending command and transmit an alert to the terminal device that the pending command was not authorized. A log of command attempts from the terminal may also be stored in a secured server for analysis by a network administrator. In this manner, commands transmitted to the network device may be verified and authorized before being executed, preventing mistaken configurations of network devices that may negatively impact the telecommunications network.

Figure 6:
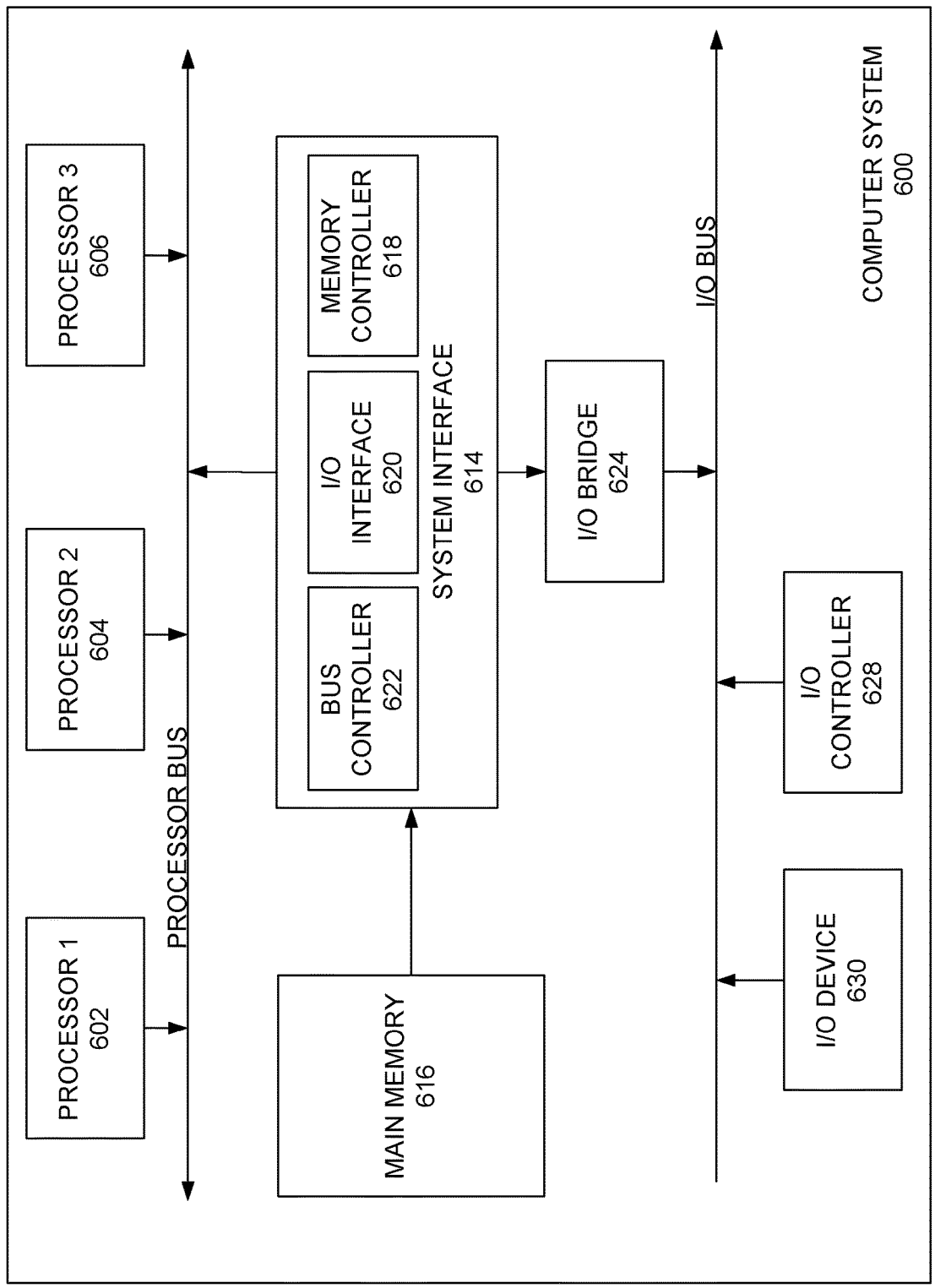
FIG. 6 is a diagram illustrating an example of a computing system which may be used in implementations of the present disclosure.

FIG. 6 is a block diagram illustrating an example of a computing device or computer system 600 which may be used in implementing the embodiments of the components of the network disclosed above. For example, the computing system 600 of FIG. 6 may be the terminal device 204 or network device security system 202 discussed above. The computer system (system) includes one or more processors 602-606. Processors 602-606 may include one or more internal levels of cache (not shown) and a bus controller or bus interface unit to direct interaction with the processor bus 612. Processor bus 612, also known as the host bus or the front side bus, may be used to couple the processors 602-606 with the system interface 614. System interface 614 may be connected to the processor bus 612 to interface other components of the system 600 with the processor bus 612. For example, system interface 614 may include a memory controller 618 for interfacing a main memory 616 with the processor bus 612. The main memory 616 typically includes one or more memory cards and a control circuit (not shown). System interface 614 may also include an input/output (I/O) interface 620 to interface one or more I/O bridges or I/O devices with the processor bus 612. One or more I/O controllers and/or I/O devices may be connected with the I/O bus 626, such as I/O controller 628 and I/O device 630, as illustrated. The system interface 614 may further include a bus controller 622 to interact with processor bus 612 and/or I/O bus 626.

I/O device 630 may also include an input device (not shown), such as an alphanumeric input device, including alphanumeric and other keys for communicating information and/or command selections to the processors 602-606. Another type of user input device includes cursor control, such as a mouse, a trackball, or cursor direction keys for communicating direction information and command selections to the processors 602-606 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606. Main memory 616 also may be used for storing temporary variables or other intermediate information during execution of instructions by the processors 602-606. System 600 may include a read only memory (ROM) and/or other static storage device coupled to the processor bus 612 for storing static information and instructions for the processors 602-606. The system set forth in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 to perform the process steps described herein. In alternative embodiments, circuitry may be used in place of or in combination with the software instructions. Thus, embodiments of the present disclosure may include both hardware and software components.

A machine readable medium includes any mechanism for storing or transmitting information in a form (e.g., software, processing application) readable by a machine (e.g., a computer). Such media may take the form of, but is not limited to, non-volatile media and volatile media. Non-volatile media includes optical or magnetic disks. Volatile media includes dynamic memory, such as main memory 616. Common forms of machine-readable medium may include, but is not limited to, magnetic storage medium; optical storage medium (e.g., CD-ROM); magneto-optical storage medium; read only memory (ROM); random access memory (RAM); erasable programmable memory (e.g., EPROM and EEPROM); flash memory; or other types of medium suitable for storing electronic instructions.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software and/or firmware.

The description above includes example systems, methods, techniques, instruction sequences, and/or computer program products that embody techniques of the present disclosure. However, it is understood that the described disclosure may be practiced without these specific details. In the present disclosure, the methods disclosed may be implemented as sets of instructions or software readable by a device. Further, it is understood that the specific order or hierarchy of steps in the methods disclosed are instances of example approaches. Based upon design preferences, it is understood that the specific order or hierarchy of steps in the method can be rearranged while remaining within the disclosed subject matter. The accompanying method claims present elements of the various steps in a sample order, and are not necessarily meant to be limited to the specific order or hierarchy presented.

It is believed that the present disclosure and many of its attendant advantages should be understood by the foregoing description, and it should be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it should be understood that these embodiments are illustrative and that the scope of the disclosure is not limited to them. Many variations, modifications, additions, and improvements are possible. More generally, embodiments in accordance with the present disclosure have been described in the context of particular implementations. Functionality may be separated or combined in blocks differently in various embodiments of the disclosure or described with different terminology. These and other variations, modifications, additions, and improvements may fall within the scope of the disclosure as defined in the claims that follow.

We claim:

1. A method for managing network devices, the method comprising:
  transmitting a plurality of inputs received from an input device to a network device, the plurality of inputs associated with a command executable by the network device;
  storing a plurality of characters in an accumulator, the plurality of characters received from the network device in response to the transmitted plurality of inputs;
  receiving a control input from the input device, the control input for executing the command at the network device;
  in response to receiving the control input, reproducing the command for the network device from the plurality of characters stored in the accumulator;
  verifying whether the reproduced command is authorized for execution at the network device including determining if the reproduced command is at least one of included in a list of authorized commands for the network device or excluded from a list of unauthorized commands for the network device, wherein at least one of the list of authorized commands and the list of unauthorized commands is based on a type of the network device; and
  when the reproduced command is not authorized, deleting the command from the network device, and generating a log entry corresponding to the command, the log entry including at least a current user of the user computing device, the command, an identifier corresponding to the network device at which the command was attempted, and a timestamp.

2. The method of claim 1, wherein at least one of the list of authorized commands and the list of unauthorized commands is based on characteristics of a user of the user computing device.

3. The method of claim 1 further comprising, when the reproduced command is authorized, transmitting the control input to the network device to cause the network device to execute the command.

4. The method of claim 1 further comprising transmitting a message for display at the user computing device indicating that the command was unauthorized.

5. The method of claim 1 further comprising storing the plurality of inputs received from the input device of the user computing device in a keyboard accumulator.

6. The method of claim 1 further comprising waiting a predetermined delay period after receiving the control input from the input device of the user computing device and verifying whether the reproduced command is authorized for execution at the network device.

7. A system for managing network devices, the system comprising:
  a network security system configured to:
  receive and transmit a plurality of inputs to a network device;
  store a plurality of characters for a command in an accumulator, the characters received from the network device in response to the transmitted plurality of inputs;
  receive a control input, the control input for executing the command at the network device;
  in response to receiving the control input, reproducing the command for the network device from the plurality of characters stored in the accumulator;
  verify whether the reproduced command is authorized for execution at the network device including determining if the reproduced command is at least one of included in a list of authorized commands for the network device or excluded from a list of unauthorized commands for the network device, wherein at least one of the list of authorized commands and the list of unauthorized commands is based on a type of the network device; and
  when the reproduced command is not authorized, delete the command from the network device, and generate a log entry corresponding to the command, the log entry including at least a current user of the user computing device, the command, an identifier corresponding to the network device at which the command was attempted, and a timestamp.

8. The system of claim 7 further comprising a command list server in communication with the network security system, the command list server storing a master command list including at least one of authorized and unauthorized commands, the network security system configured to update the at least one of the at least one of the list of authorized commands and the list of unauthorized commands by receiving at least a portion of the master command list.

9. The system of claim 7, wherein the network security system is further configured to, when the reproduced command is authorized, transmit the control input to the network device to cause the network device to execute the command.

10. The system of claim 7, wherein the network security system is further configured to when the reproduced command is not authorized, transmit a message for display at the user computing device indicating that the command was unauthorized.

11. The system of claim 7, wherein the network security system is further configured to store the plurality of inputs received from the input device in a keyboard accumulator.

12. One or more non-transitory tangible computer-readable storage media storing computer-executable instructions for performing a computer process on a computing system, the computer process comprising:
  transmitting a plurality of inputs received from an input device to a network device, the plurality of inputs associated with a command executable by the network device;
  storing a plurality of characters in an accumulator, the plurality of characters received from the network device in response to the transmitted plurality of inputs;
  receiving a control input from the input device, the control input for executing the command at the network device;
  in response to receiving the control input, reproducing the command for the network device from the plurality of characters stored in the accumulator;
  verifying whether the reproduced command is authorized for execution at the network device including determining if the reproduced command is at least one of included in a list of authorized commands for the network device or excluded from a list of unauthorized commands for the network device, wherein at least one of the list of authorized commands and the list of unauthorized commands is based on a type of the network device; and when the reproduced command is not authorized, deleting the command from the network device, and generating a log entry corresponding to the command, the log entry including at least a current user of the user computing device, the command, an identifier corresponding to the network device at which the command was attempted, and a timestamp.

13. The computer-readable storage media of claim 12, wherein the computer process further comprises, when the reproduced command is authorized, transmitting the control input to the network device to cause the network device to execute the command.

14. The computer-readable storage media of claim 12, wherein the computer process further comprises, when the reproduced command is not authorized transmitting a message for display at the user computing device indicating that the command was unauthorized.

\* \* \* \* \*